Oct. 8, 1963  K. REESE  3,106,266
FRICTION ENGAGING DEVICE
Filed Oct. 18, 1960  3 Sheets-Sheet 1

INVENTOR.
KARL REESE
BY
Kenneth C. Witt
ATTORNEY

Oct. 8, 1963     K. REESE     3,106,266
FRICTION ENGAGING DEVICE
Filed Oct. 18, 1960     3 Sheets-Sheet 2

INVENTOR.
KARL REESE
BY
ATTORNEY

INVENTOR.
KARL REESE
BY Kenneth C. Witt
ATTORNEY

United States Patent Office 3,106,266
Patented Oct. 8, 1963

3,106,266
FRICTION ENGAGING DEVICE
Karl Reese, Mulheim (Ruhr), Germany, assignor to Ruhr Intrans Hubstapler, G.m.b.H., a registered German company
Filed Oct. 18, 1960, Ser. No. 63,393
Claims priority, application Germany Jan. 7, 1960
2 Claims. (Cl. 188—78)

The invention relates to a friction engaging device having shoe members with friction linings secured to their outer surfaces which are held in the rest position by means of elastic members, as, for example, springs, and, in the engaging process, are pressed—by means, say, of a mechanical, hydraulic or pneumatic operating member— against the inside surface of a drum.

In a vehicle brake there are ordinarily mounted as brake-lining carriers two or three curved brake shoes situated inside the brake drum in its circumferential direction. In the braking process, these brake shoes, equipped on their outer surfaces with brake linings, are moved toward the brake drum and with the brake linings are pressed against the inner surface of the brake drum. The pressing of the brake shoes is accomplished in a mechanical brake by a twisting of a brake cam and in a hydraulic brake by one or more hydraulic pistons which are conducted in hydraulic cylinders. The brake cams or the hydraulic cylinders are arranged between the brake shoes in the circumferential direction of the brake drum and cover a range of from 20 to 25% of the inner surface of the brake drum. This means that about a quarter of the brake surface available on the inner surface of the brake drum is unused.

This disadvantage is obviated when the present invention is used as a vehicle brake in the manner of construction described in the introduction, by providing as brake-lining carriers, brake segments or shoes, independent of one another, bordering on each other in the circumferential direction of the brake drum, the brake-linings of which segments cover the entire inner surface of the brake drum, and by arranging the operating member for the brake segments under their inner surfaces.

Hereby the entire brake surface available on the inner surface of the brake drum is utilized. From this there results the further advantage that with conditions otherwise the same the brake drum of the brake according to the invention can be produced with a circumference smaller by about a quarter in comparison to the brake drums of the inside shoe brakes known hitherto. Without increase of the specific surface load of the brake lining (which represents a criterion for the efficiency of the brake and the wear behavior of the brake linings) the brake becomes smaller in its dimensions and has, consequently, a lower weight. This is especially advantageous in the case of installation in motor vehicles, because with the lighter-weight brake in the wheel spring suspension the mass of the floating parts is advantageously reduced, and in consequence the driving quality of the vehicle is improved. For the achievement of the same braking effect in both turning directions of the brake drum it was hitherto necessary to use special devices such as additional brake cylinders or rods. With this invention, with the elimination of such arrangements decreasing the manufacturing cost and the weight of the brake, an equal braking effect is achieved in both turning directions of the brake drum.

A further development of the invention consists in having the brake segments lie with their inner surfaces on a brake hose which, in the braking process, for the applying of the brake linings to the inner surface of the brake drum, is filled with a brake pressure medium. Thereby the brake cylinders or brake cams and the rods necessary for their operation are dispensed with, so that the weight and, accordingly, the mass of the brake remains advantageously small.

According to another execution of the invention, the brake segments are borne in radially slidable relation to a segment carrier attached to a fixed part of the vehicle, as, for example, to a brake mask or support plate, in which arrangement the brake segments are held in the rest position by means of cylindrical spiral springs or the like. The brake segments, accordingly, rest on simple structural elements and can be easily installed and dismantled.

According to a further feature of the invention the brake segments are equipped on their sides situated parallel to the long axis of the segment carrier with slots directed in the circumferential direction of the segment carrier, with which the brake segments engage by way of corresponding radial fillets of the segment carrier, in which construction the brake segments overlie in axial direction both outer surfaces of the fillets and are provided on the overlying parts of their inner surfaces each with a holding hasp or the like pointing toward the center of the segment carrier for the suspension of the spiral pull springs. From this there results an advantageous utilization of space. The springs are readily accessible, so that they can be easily installed and removed.

The invention is described in the following with the aid of an example of execution represented in the drawing.

Figure 4:
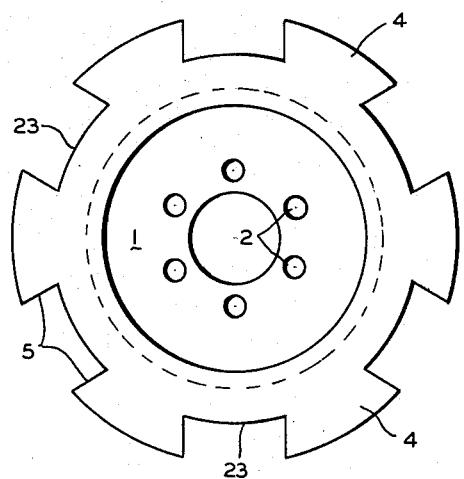
FIGURE 4 is a side elevation of the segment carrier.
Figure 5:
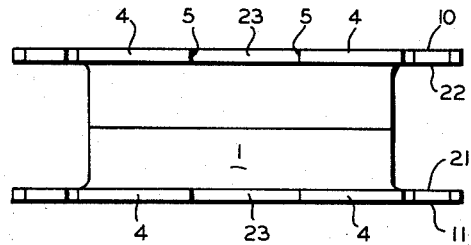
FIGURE 5 is a plan view of the segment carrier according to FIGURE 4.

On a fixed vehicle part (not represented), as, for example, a brake mask, a ring-shaped segment carrier 1 is secured by means of holding screws (not shown) conducted through bores 2. The segment carrier has a concentric opening 3 for the passage of the wheel axle and is shaped in section at its outer circumference in U-form (FIG. 5). As is shown especially in FIGS. 2 and 5, the segment carrier 1 is composed of two connected ring members, arranged in allochiral relation to one another. These can be produced as pressed parts and joined, say, by point welding, riveting or the like. The segment carrier is equipped on the two flanges or shanks of its U-form cross-section with radially arranged fillets or projections 4 at equal distances on the outer circumference. The adjacent fillets 4 have confronting parallel side surfaces 5. In the example of execution (FIGS. 4 and 5) there are provided on both shanks of the U-shaped cross-section of the segment carrier six pairs of fillets.

On the segment carrier there are six brake segments 6, independent of one another, bordering on one another in the circumferential direction of the brake drum (not shown). These brake segments are in circular arc form and each has on its outer surface a riveted or glued brake lining 7. The brake linings 7 of the brake segments 6 cover the entire inner surface of the unrepresented brake drum. For the easy installing or removal of the brake segments there are situated (FIGS. 1 to 3) between this and also between the brake linings 7 radial gaps *s*. The number of brake segments is governed by the particular employment of the brake and by the constructional circumstances.

Figure 7:
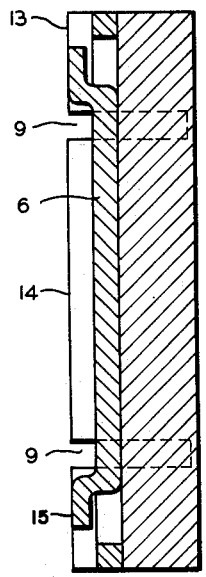
FIGURE 7 is a section through the brake segment along line 7—7 in FIGURE 6.
Figure 6:
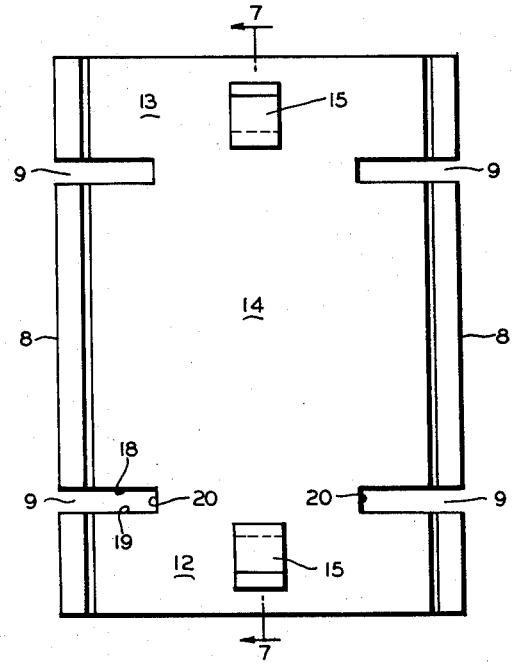
FIGURE 6 is a view of the inner surface of a brake segment on a larger scale.
Figure 8:
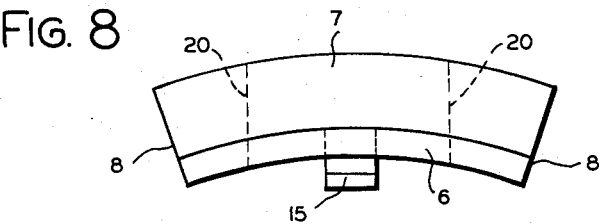
FIGURE 8 is the front view of a brake segment on a larger scale.

The brake segment 6 and the brake lining 7 are equipped on their sides 8 situated parallel to the long axis of the segment carrier 1 with slots 9 (FIGS. 6 and 7) directed in the circumferential direction of the segment carrier. With these slots the brake segments engage by way of the radial fillets (crosspieces) 4 of the segment carrier 1, in which arrangement the brake segments overlie in axial direction (FIG. 2) both outer surfaces 10, 11, of fillets 4, and are provided on the overlying parts 12, 13, of their inner surface 14 (FIGS. 6 and 7) each with a holding hasp 15 for the suspension of spiral pull springs 16. Instead of a number of spiral pull springs 16, it is possible in the same manner to use an endless spiral pull spring, which grips over all the holding hasps 15 of the brake segments 6.

The brake segments 6 lie on a brake hose 17 (FIG. 2) filled with a brake pressure medium, having an oval cross-section and made of a suitable material, which is inserted in the U-shaped cross-section of the segment carrier 1. The brake hose 17 is connected to a pressure-medium line (not shown), which leads to a brake-operating installation, which, for the sake of simplicity, is likewise not represented in the drawing.

Figure 1:
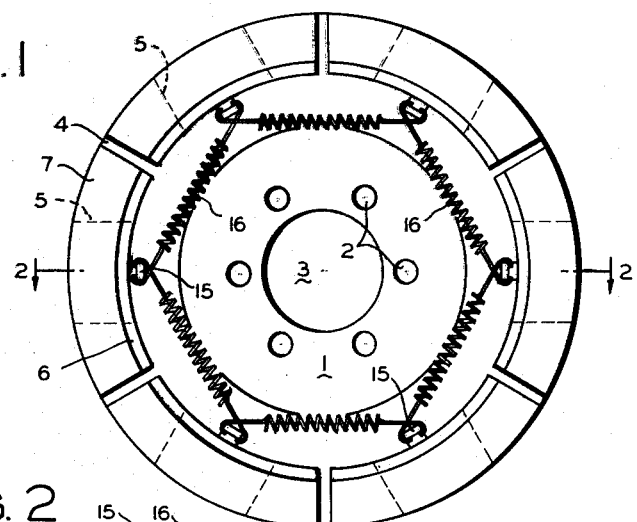
FIGURE 1 is a side view of the segment carrier with brake segments placed on it.
Figure 2:
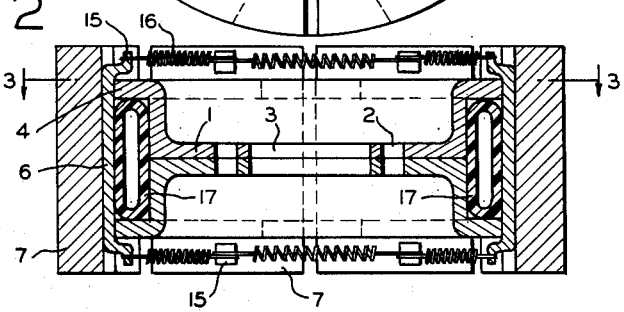
FIGURE 2 is a cross-section through the segment carrier along the line 2—2 in FIGURE 1.
Figure 3:
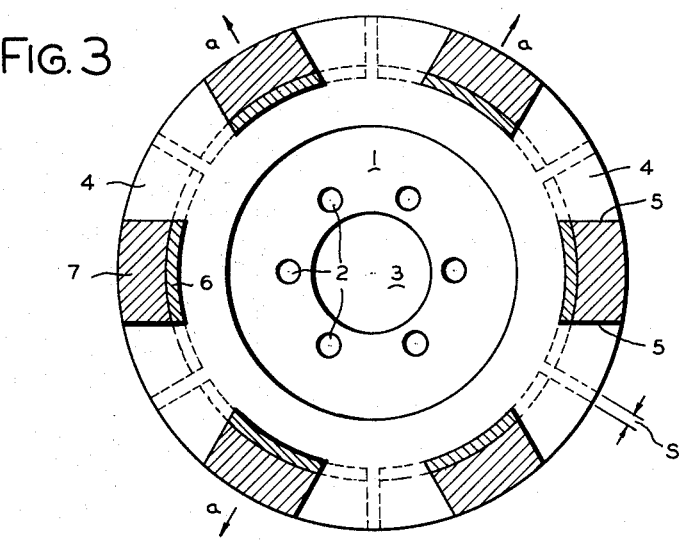
FIGURE 3 is a section through the brake segments along the line 3—3 in FIGURE 2.

In the braking process, the brake hose 17 is expanded by the inflowing pressure medium, as, for example, a brake fluid, and lifts the brake segments 6 radially in arrow direction *a* from the segment carrier 1 and presses them with their brake linings 7 against the inner surface of the brake drum, not shown in the example of execution. In this process, the brake segments, by means of their slots 9—which have parallel side surfaces 18, 19, and also parallel end surfaces 20—are conducted (or guided) at the outer surfaces 10, 11 and also inner surfaces 21, 22 and at the parallel side surfaces 5 of fillets 4, and are held in contact on the brake hose 17 by the spiral pull springs 16. For the releasing of the brake, the brake pressure medium is relieved of its working pressure. The brake segments 6 are now conducted back under simultaneous restoration of the brake hose to its starting position as shown in FIG. 2 by the cylindrical spiral pull springs 16, into their rest position as illustrated in FIGS. 1 to 3—that is, released from the inner surface of the brake drum and brought into resting contact on the contact surfaces 23 situated between the fillets 4 of the segment carrier 1.

The invention is not limited to the example of execution represented and described. It is possible, for example, within the scope of the invention, to press the brake segments 6 against the brake drum, instead of with a brake hose, with corresponding mechanical devices, as, for example, by means of a pressure ring turnable in the circumferential direction of the segment carrier 1. In such a case, the pressure ring expediently takes the place of the brake hose 17. The pressure ring is advantageously provided with wedge surfaces which, in the turning of the ring, press against the brake drum.

I claim:

1. A friction engaging device comprising, a circularly disposed carrier having a pair of axially spaced outwardly extending circular flange portions forming an outwardly facing annular channel, a plurality of arcuate shoe members positioned around the periphery of the said carrier forming a discrete outer cylindrical surface, a plurality of pairs of projections extending radially outwardly from the said flange portions and equal in number to said arcuate shoe members, the said shoe members extending between the said projections and overhanging the flange portions, one projection of each pair being located on each flange and all projections being of substantially the same thickness as the flanges and of greater extent circumferentially than the said thickness, each of the said shoe members having four circumferentially extending grooves arranged two each in the side surfaces thereof and embracing the said projections, and means located in the said channel beneath said shoes for operating the shoes outwardly.

2. A vehicle brake comprising, a circularly disposed shoe carrier member composed of two allochirally related parts secured together and having a pair of offset axially spaced outwardly extending circular flange portions forming an outwardly facing annular channel therebetween, a plurality of pairs of integrally formed radially extending projections on the said flange portions of approximately the same thickness as the flange portions and of circumferential extent greater than the said thickness, the said projections being all identical and spaced uniformly around each flange and the confronting surfaces of adjacent projections being approximately parallel to each other, an equal plurality of arcuate shoe members each of a greater axial length than the distance between the outside surfaces of the said flange members, and each shoe of slightly smaller circumferential extent than the circumferential extent of one of the said projections plus the space between adjacent projections, each of the said shoes having four circumferentially extending grooves extending two each into opposite side surfaces thereof for receiving the said projections, whereby the said shoe members are adapted to be positioned on the said flange portions with each shoe member embracing four of the said projections and with the shoe members overhanging both flange portions axially and forming a discrete outer cylindrical surface, hollow fluid expansible means located in the said channel for operating the said shoes outwardly, hasp means on each shoe member projecting inwardly from each overhanging portion thereof, and spring means secured to the said hasp means beneath the said overhanging portions for restoring the shoes to their initial inward position.

References Cited in the file of this patent

UNITED STATES PATENTS

| | | |
|---|---|---|
| 2,185,250 | Frank | Jan. 2, 1940 |
| 2,389,977 | Hollerith | Nov. 27, 1945 |
| 2,457,344 | Butler | Dec. 28, 1948 |
| 2,695,697 | Stoeckicht | Nov. 30, 1954 |